(12) United States Patent
Huang et al.

(10) Patent No.: US 10,147,173 B2
(45) Date of Patent: Dec. 4, 2018

(54) SYSTEM AND METHOD FOR SEISMIC DATA INTERPRETATION

(71) Applicants: GENERAL ELECTRIC COMPANY, Schenectady, NY (US); EXXONMOBIL UPSTREAM RESEARCH COMPANY, Houston, TX (US)

(72) Inventors: Xiaojie Huang, Schenectady, NY (US); Ali Can, Niskayuna, NY (US); Shubao Liu, Windermere, FL (US); Mark W. Dobin, The Woodlands, TX (US); Mary Johns, Houston, TX (US); Leslie A. Wahrmund, Kingwood, TX (US)

(73) Assignees: GENERAL ELECTRIC COMPANY, Schenectady, NY (US); EXXONMOBIL UPSTREAM RESEARCH COMPANY, Houston, TX (US)

(*) Notice: Subject to any disclaimer, the term of this patent is extended or adjusted under 35 U.S.C. 154(b) by 130 days.

(21) Appl. No.: 14/985,901

(22) Filed: Dec. 31, 2015

(65) Prior Publication Data
US 2017/0193647 A1    Jul. 6, 2017

(51) Int. Cl.
| G06K 9/00 | (2006.01) |
| G06T 7/00 | (2017.01) |
| G01V 1/28 | (2006.01) |
| G01V 1/30 | (2006.01) |

(52) U.S. Cl.
CPC .............. *G06T 7/0004* (2013.01); *G01V 1/28* (2013.01); *G01V 1/301* (2013.01); *G01V 2210/64* (2013.01); *G06T 2207/30181* (2013.01)

(58) Field of Classification Search
None
See application file for complete search history.

(56) References Cited

U.S. PATENT DOCUMENTS

| 7,272,593 B1 * | 9/2007 | Castelli ............. G06F 17/30648 707/600 |
| 7,660,674 B2 | 2/2010 | Magill et al. |
| 8,447,524 B2 | 5/2013 | Chen et al. |
| (Continued) | | |

OTHER PUBLICATIONS

Pitas, et al.,"Knowledge-Based Image Analysis for Geophysical Interpretation", Journal of Intelligent and Robotic Systems 7: pp. 115-137, 1993.
(Continued)

*Primary Examiner* — Weiwen Yang
(74) *Attorney, Agent, or Firm* — Fletcher Yoder, P.C.

(57) ABSTRACT

A method for identifying a plurality of features of interest in a seismic image includes ranking each feature of interest. The method also includes modeling a relationship between the rank of each feature of interest and a user rating of the feature of interest. The method further includes updating the ranking of the plurality of features of interest, including (1) receiving a user rating for one feature of interest that has not been previously rated by a user; (2) updating the model of the relationship between the rank of each feature of interest and the user rating of the feature of interest based on the user rating; (3) applying the model to the ranking of the plurality of features of interest; and (4) repeating steps (1)-(3) until a termination criterion is met.

16 Claims, 13 Drawing Sheets

(56) References Cited

U.S. PATENT DOCUMENTS

| | | | |
|---|---|---|---|
| 8,805,737 B1 * | 8/2014 | Chen ................ | G06Q 40/00 235/380 |
| 2006/0280031 A1 | 12/2006 | Chopra et al. | |
| 2013/0064040 A1 | 3/2013 | Imhof et al. | |
| 2014/0188769 A1 | 7/2014 | Lim et al. | |
| 2014/0278115 A1 | 9/2014 | Bas et al. | |
| 2014/0303896 A1 | 10/2014 | Wrobel et al. | |

OTHER PUBLICATIONS

Bond et al., "What do you think this is? 'Conceptual uncertainty' in geoscience interpretation", GSA Today: v. 17, No. 11, pp. 4-11, Nov. 2007.

* cited by examiner

SYSTEM AND METHOD FOR SEISMIC DATA INTERPRETATION

BACKGROUND

The subject matter disclosed herein relates to the analysis of seismic data, such as automatically identifying features of interest.

Seismic data is collected and used for evaluating underground structures and features that might otherwise not be discernible. Such seismic data may be useful in searching for minerals or materials (such as hydrocarbons, metals, water, and so forth) that are located underground and which may be difficult to localize. In practice, the seismic data is derived based on the propagation of seismic waves through the various strata forming earth. In particular, the propagation of seismic waves may be useful in localizing the various edges and boundaries associated with different strata within the earth and with the surfaces of various formations or structures that may be present underground.

The seismic waves used to generate seismic data may be created using any number of mechanisms, including explosives, air guns, or other mechanisms capable of creating vibrations or seismic waves capable of spreading through the Earth's subsurface. The seismic waves may reflect, to various degrees, at the boundaries or transitions between strata or structures, and these reflected seismic waves are detected and used to form a set of seismic that may be used to examine the subsurface area being investigated.

One challenge that arises in the context of these seismic investigations is the interpretation and analysis of the large three-dimensional data sets that can be generated in a seismic survey project. In particular, analysis of such data sets may be tedious and time-consuming, potentially requiring months of manual work to analyze. Further, the complexity of the seismic data may limit the usefulness or effectiveness of automated approaches for data analysis.

BRIEF DESCRIPTION

In a first embodiment, a method for identifying a plurality of features of interest in a seismic image includes ranking each feature of interest in the plurality of features of interest. The method also includes modeling a relationship between the rank of each feature of interest and a user rating of the feature of interest. The method further includes updating the ranking of the plurality of features of interest, wherein updating the ranking includes performing acts of: (1) receiving a user rating for one feature of interest that has not been previously rated by a user; (2) updating the model of the relationship between the rank of each feature of interest and the user rating of the feature of interest based on the user rating; (3) applying the model of the relationship between the rank of each feature of interest and the user rating of the feature of interest to the ranking of the plurality of features of interest; and (4) repeating steps (1)-(3) until a termination criterion is met.

In a second embodiment, a system for identifying a plurality of features of interest in a seismic image includes a processor. The processor is configured to rank each feature of interest in the plurality of features of interest. The processor is also configured to model a relationship between the rank of each feature of interest and a user rating of the feature of interest. The processor is further configured to update the ranking of the plurality of features of interest, wherein updating the ranking of the plurality of features of interest comprises executing routines for: (1) receiving a user rating for one feature of interest that has not been previously rated by a user; (2) updating the model of the relationship between the rank of each feature of interest and the user rating of the feature of interest based on the user rating; (3) applying the model of the relationship between the rank of each feature of interest and the user rating of the feature of interest to the ranking of the plurality of features of interest; and (4) repeating steps (1)-(3) until a termination criterion is met.

In a third embodiment, a method includes accessing a seismic image comprising a plurality of features of interest. The method also includes defining a plurality of configuration files for a plurality of graphical models. The method further includes applying the plurality of graphical models to the seismic image. The method also includes generating a plurality of scores for each feature of interest, wherein each graphical model generates a score for each feature of interest. The method further includes combining the plurality of scores for each feature of interest into a plurality of combined scores, wherein each feature of interest has a combined score. The method also includes ranking each feature of interest in the plurality of features of interest. The method further includes modeling a relationship between the rank of each feature of interest and a user rating of the feature of interest. The method also includes updating the ranking of the plurality of features of interest, wherein updating the ranking includes performing the acts of: (1) receiving a user rating for one feature of interest that has not been rated by a user; (2) updating the model of the relationship between the rank of each feature of interest and the user rating of the feature of interest based on the user rating; (3) applying the model of the relationship between the rank of each feature of interest and the user rating of the feature of interest to the ranking of the plurality of features of interest; and (4) repeating steps (1)-(3) until a termination criterion is met.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
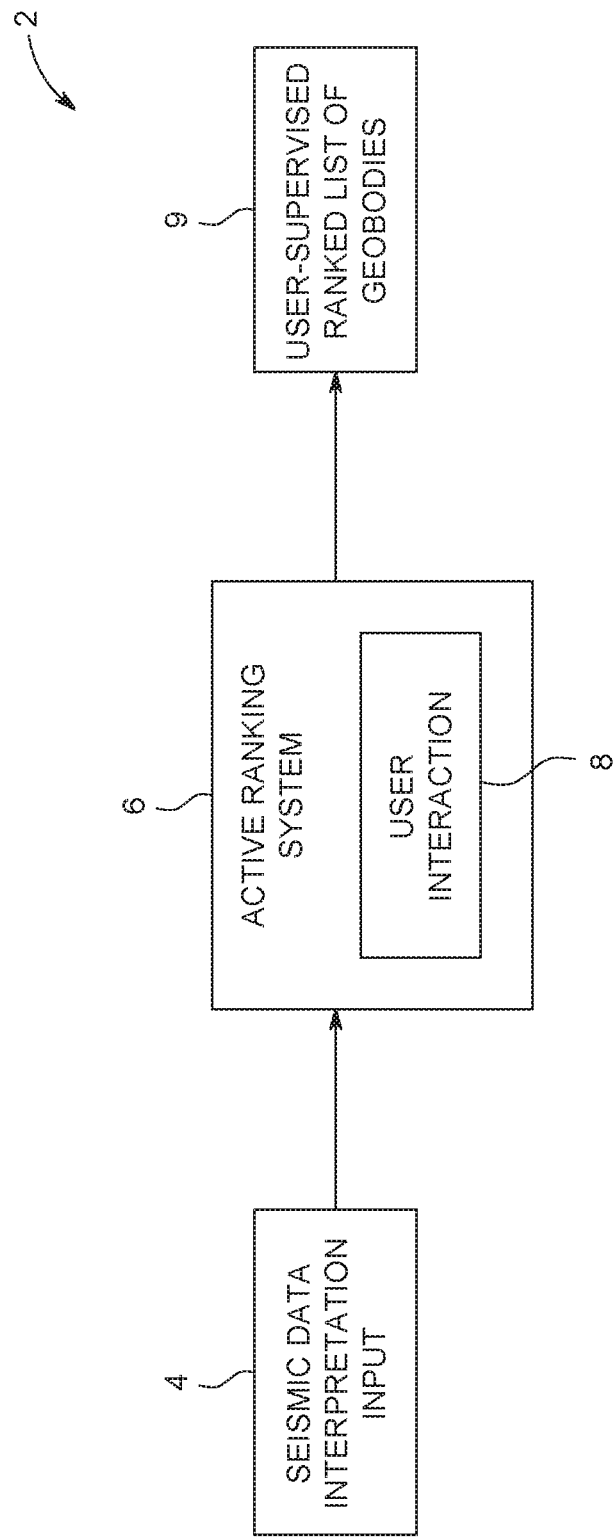
FIG. 1 illustrates a workflow of an embodiment of a seismic data interpretation system in accordance with aspects of the present disclosure.

Seismic data may be analyzed and used to detect subsurface features of interest, such as geological structures or formations that may be indicative of hydrocarbon resources. For example, detecting geobodies (e.g., channels, pinchouts, progrades, gas chimneys, and so forth) from a three-dimensional (3D) seismic image or survey may be performed as part of prospecting for hydrocarbons (e.g., oil, natural gas, and so forth). As generally used herein, a geobody is a geophysical feature of interest contained in the seismic data or some derived (attribute) data set. Such a geobody may take the form, in a volumetric data set, of a set of contiguous, connected, or proximate voxels within the image data that may in turn, based on the characteristics of the identified voxels, correspond to an actual physical or geological feature or structure within the data, such as a geological structure, formation, or feature. Although the present discussion is generally described in the context of seismic data, it should be appreciated that the present approaches and discussion may be generally applicable in the context of geophysical data (attributes, velocities, or impedances or resistivity volumes), geologic data (geologic models, or geologic simulations), wireline data, or reservoir simulation data or any combinations thereof.

One of the challenges in hydrocarbon prospecting is the time-consuming and imprecise task of interpreting the 3D volumes generated from the acquired seismic image. For example, a single seismic volume may require months of manual work to analyze. As discussed herein, automated methods may make such time-consuming work less arduous for a reviewer to interpret. However, automated interpretation of a 3D volume generated from seismic images may be difficult to achieve in practice. For example, it may be useful for an automated analysis of seismic data to classify and, in certain instances, rank or otherwise sort various geobodies (e.g., channels, pinchouts, progrades, gas chimneys, and so forth) identified in a seismic volume according to type and/or the degree of interest or preference for certain types of features. As will be appreciated, certain types of geological features (or features having certain characteristics) may be of more interest than other types. It would, therefore, be useful if the geological features that are of the greatest interest to the reviewer are ranked or sorted so as to make the review of these features more efficient or productive.

By way of brief introduction, it should be appreciated that automated approaches to analyzing seismic data may involve algorithms used to identify geobodies within a seismic volume, to classify these features into different types or by different characteristics, and, in some instances, to separately rank a set of classified features to further facilitate user review. For example, computer-aided inference systems that aim to imitate the decision-making of a human expert have proven to be effective in identifying geobodies in seismic images. Graphical-model-based seismic data interpretation systems may be used to capture geophysical properties of a geobody. A graphical model characterizes the geophysical properties by defining geophysical attributes and relationships between these attributes (e.g., rules). A variety of geophysical context information may be represented by different combinations of attributes and rules.

A user may define the graphical model by modifying a corresponding configuration file. The inference system may then screen the seismic image to generate a list of geobodies whose geophysical context information agree with the graphical model. Each listed geobody may be scored based on agreement with the graphical model and the list of geobodies may be ranked based upon their scores. A user may review the ranked list for geobodies exhibiting desirable characteristics. It may be desirable for the user to take advantage of the seismic data interpretation system that applies a plurality of graphical models that include a variety of attributes, rules, and parameters for a more accurate result. It may further be desirable for the user to use the seismic data interpretation system to combine the results of applying the plurality of graphical models, for example, in a combined ranked list of geobodies such that the user may review only one list of geobodies rather than a list of geobodies for each graphical model used.

Even with the use of the plurality of graphical models and the combined ranked list of geobodies, the user may prefer some geobodies over others, despite being provided with each geobody's ranking. Accordingly, an active ranking system or method that interacts with the user while the user is reviewing the results of the seismic data interpretation system and actively learns from user feedback to iteratively refine the ranking of geobodies may be desirable. Specifically, the active ranking system or method may enable the user to provide user ratings for geobodies provided in a seismic image interpretation input. Generalized linear models may model the relationship between each geobody's ranking and the user rating of the geobody. As the user provides each new user rating for the geobodies in the combined ranked list of geobodies, the generalized linear model may be dynamically updated by incorporating the user rating. The combined ranked list of geobodies may then be updated using the updated generalized linear model. Besides the updated combined ranked list of geobodies, the user may also access terminal graphical model weights that quantify the effectiveness of each graphical model. While the following discussion applies active ranking to combining multiple graphical model results, it should be noted that this disclosure includes embodiments that actively ranking geobodies in seismic interpretation that may be based on information that includes but is not limited to multiple graphical model inference.

FIG. 1 illustrates a workflow of an embodiment of a seismic data interpretation system 2 in accordance with aspects of the present disclosure. A seismic data interpretation input 4 may be analyzed. The seismic data interpretation input 4 may include a seismic image or data related to the seismic image. For example, the seismic data interpretation input 4 may be a list of geobodies and geophysical attributes corresponding to each geobody. The seismic data interpretation input 4 may be scored or ranked by an active ranking system 6. The active ranking system 6 may enable user interaction 8 such that the seismic data interpretation system 2 actively learns from user feedback to iteratively refine a ranking of the geobodies. As a result, the seismic data interpretation system 2 may output a user-supervised ranked list 9 of geobodies. The use of the active ranking system 6 may improve an efficiency of identifying geobodies in seismic data interpretation and reduce an amount of user evaluations needed for the user to identify the most promising geobodies in the seismic data interpretation input 4.

Figure 2:
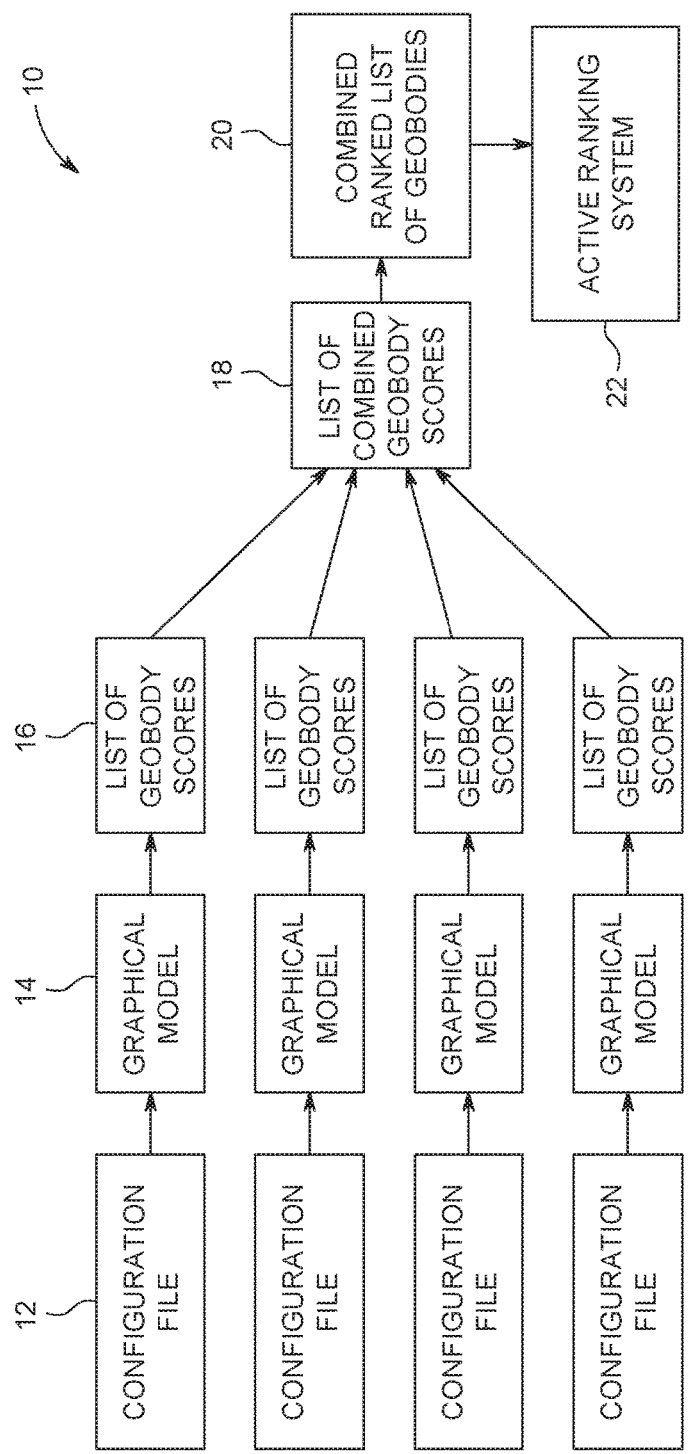
FIG. 2 illustrates another workflow of an embodiment of a seismic data interpretation system in accordance with aspects of the present disclosure.

FIG. 2 illustrates a more detailed workflow of an embodiment of a seismic data interpretation system 10. A seismic data interpretation input 4 may include a plurality of configuration files 12, a plurality of graphical models 14, and a resulting plurality of lists 16 of geobody scores. The user may define the plurality of graphical models 14 by modifying the corresponding plurality of configuration files 12 that capture the geophysical properties of the desired geobody. Specifically, the user may modify geophysical attributes and rules that are defined in the plurality of configuration files 12. The seismic data interpretation system 10 may identify geobodies by segmentation algorithms. For example, for carbonate mounds, each geobody identified is segmented as connected components that satisfy the geophysical properties provided by each configuration file 12, such as termination, closure, amplitude polarity, and amplitude magnitude. A computer-aided inference system then uses each configuration file 12 to apply each corresponding graphical model 14 to the seismic image. For each geobody identified, each graphical model 14 may compute a score based on agreement of the geophysical characteristics of the geobody with the graphical model 14. The plurality of graphical models 14 may generate a corresponding plurality of lists of geobody scores 16. Based on the plurality of lists 16 of geobody scores, the plurality of graphical models 14 may also generate a corresponding plurality of ranked lists of geobodies.

An active ranking system 6 may include a list 18 of combined geobody scores, an unsupervised combined ranked list 20 of geobodies, and a user-supervised combined ranking 22 of geobodies. The plurality of lists 16 of geobody scores are combined into the list 18 of combined geobody scores. In some embodiments, the geobody scores in the plurality of lists 16 of geobody scores are first normalized before combining. In some embodiments, the geobody ranks in the corresponding plurality of ranked lists of geobodies are used as geobody scores, which are then combined to generate the list 18 of combined geobody scores. The seismic data interpretation system 10 may use a correlation-based combination ranking approach to generate the list 18 of combined geobody scores. In some embodiments, other combination approaches may be used. For example, the seismic data interpretation system 10 may combine the scores for each geobody by averaging the scores for each geobody. As another example, the scores for each geobody may be combined by taking the maximum geobody score generated from the plurality of graphical models 14.

As discussed above, each graphical model 14 generates the score for each geobody, culminating in the corresponding list 16 of geobody scores. Suppose one geobody score $s_{i,j}$ is generated by one graphical model i for each geobody j. Because the geobody scores are generated using different attributes and rules as defined in the respective plurality of configuration files, they may have different meaning and therefore may be difficult to compare directly. As a result, it may be more reliable to use the rank of the geobody as the score to generate the list 18 of combined geobody scores. A rank $r_{i,j}$ for each geobody j may be determined by sorting the geobody scores $s_i$ generated by a single graphical model i in descending order. Thus, the list 18 of combined geobody scores is more accurately a list of combined geobody ranks. Accordingly, for the present embodiment, $s_{i,j}$ is redefined as $-r_{i,j}$ and references to the score of a geobody actually refer to the rank of a geobody from here on.

The seismic data interpretation system 10 may then rank the geobodies in the list 18 of combined geobody scores to generate the unsupervised combined ranked list 20 of geobodies. "Unsupervised" in this application means that the list 20 has not been evaluated by the user (i.e., has not been combined with user interaction 8 related to the active ranking system 6). The active ranking system 6 may enable the seismic data interpretation system 10 to receive user feedback and actively rank the geobodies in the unsupervised combined ranked list 20 of geobodies based on the user feedback. The unsupervised combined ranked list 20 of geobodies may then undergo a process of user-supervised ranking 22 of geobodies. The active ranking system 6 may output a user-supervised ranked list of geobodies 9.

Figure 3:
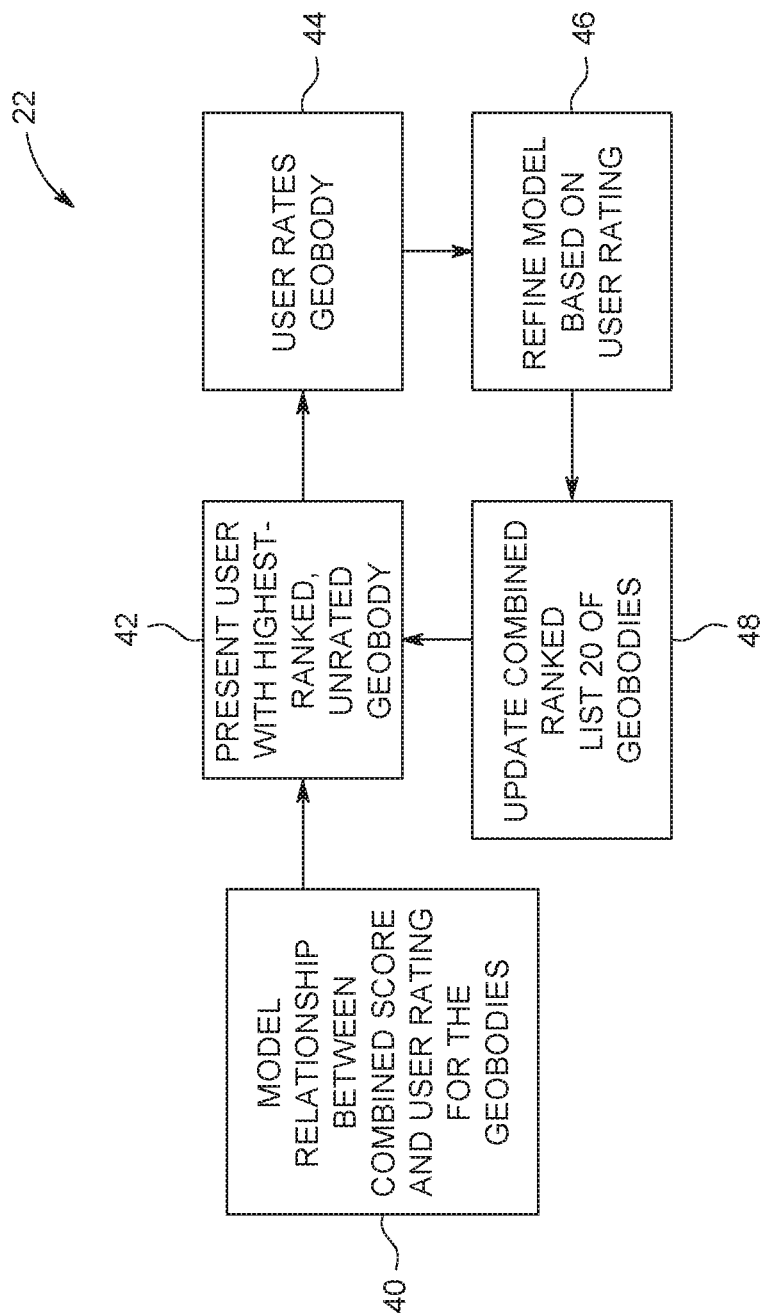
FIG. 3 illustrates a workflow of an embodiment of an active ranking system in accordance with aspects of the present disclosure.

FIG. 3 illustrates a workflow of an embodiment of an active ranking system 6. The active ranking system 6 may include the process of user-supervised ranking of geobodies 22. In some embodiments, as shown in FIG. 2, the active ranking system 6 may also include the list 18 of combined geobody scores and the unsupervised combined ranked list 20 of geobodies. The active ranking system 6 may model 40 a relationship between the combined score and a user rating for the geobodies. The active ranking system 6 then presents 42 the user with the highest-ranking, unrated geobody in the combined ranked list 20 of geobodies. In some embodiments, the geobody presented to the user may be selected based on other criteria. For example, the geobody presented to the user may be a randomly selected unrated geobody. The user may rate 44 the geobody by providing a rating on a scale of 1 to 6 (where1 is best and 6 is worst). In some embodiments of the active ranking system, the system may query the user in other ways. For example, the rating scale may be within any range of numbers, such as 0 to 10 or 1 to 100. Alternatively, the user may provide a positive, negative, or neutral rating. After obtaining the user rating, the active ranking system 6 may refine 46 the model 40 describing the relationship between the combined score and the user rating for the geobodies based on the user rating 44. The active ranking system 6 may learn a better way to combine the plurality of graphical models 14 and change the weights of one or more graphical models 14 based on the user rating 44. The active ranking system 6 may update 48 the user-supervised ranked list 9 of geobodies based on the refined model 46. The active ranking system 6 may repeat the steps 42, 44, 46, 48 until a termination criterion is met.

The active ranking system 6 may model 40 the relationship between the combined score and the user rating for the geobodies by modeling the relationship between the geobodies' scores, $s_{i,j}$, and optimal user ratings, $\tilde{g}_j$, for the geobodies. Generalized linear models may be employed which assume:

$$E(\tilde{g}_j) = f(w^T s_j) \quad (1)$$

where $f(w^T s_j)$ is a function linking the linearly weighted combined rank, $w^T s$, of geobody j with the expected optimal user score $E(\tilde{g}_j)$ of geobody j.

Figure 4:
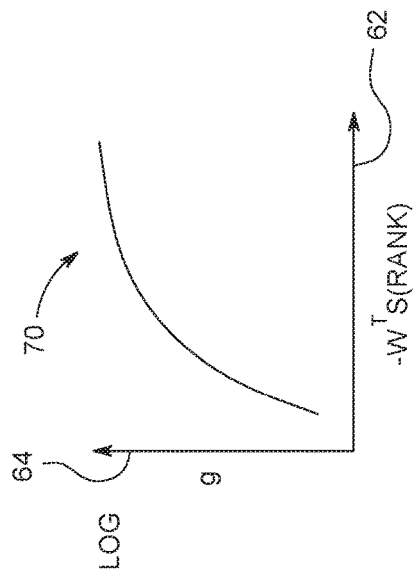
FIG. 4 depicts a linear model for a link function of an embodiment in accordance with aspects of the present disclosure.
Figure 6:
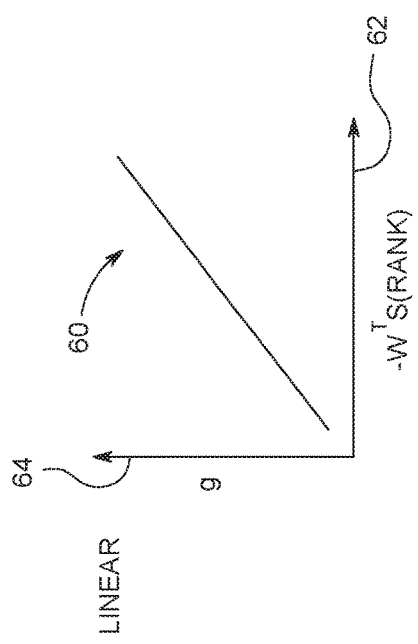
FIG. 6 depicts a multinomial logistic model for a link function of an embodiment in accordance with aspects of the present disclosure.
Figure 5:
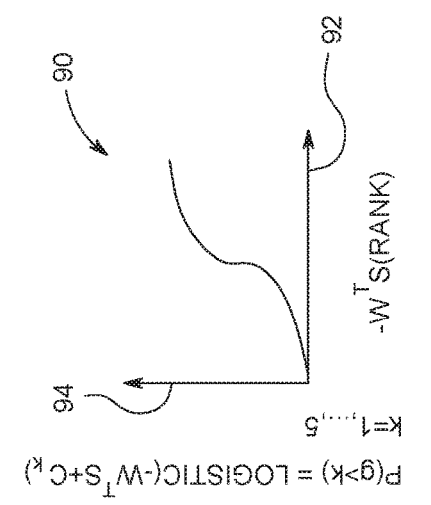
FIG. 5 depicts a logarithmic model for a link function of an embodiment in accordance with aspects of the present disclosure.
Figure 7:
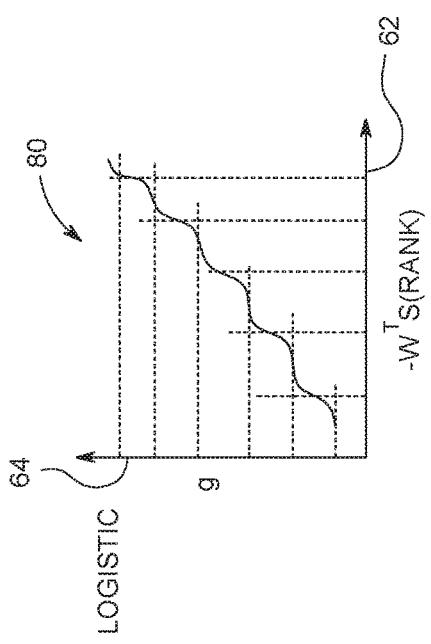
FIG. 7 depicts a probability model for a multinomial logistic model for a link function of an embodiment in accordance with aspects of the present disclosure.

Examples of link functions are depicted in FIGS. 3-5. Because the geobody rank is used as the score in the present embodiment, the geobodies are generally evenly distributed over the combined geobody score range. FIG. 4 depicts a linear model 60 for the link function, where the x-axis 62 is the combined rank of each geobody, $-w^T s$, and the y-axis 64 is the user rating for each geobody, $g_j$. The linear model 60 assumes that the geobodies are evenly distributed over the user rating range 64. That is, the user will rate approximately as many geobodies as good (i.e. numerically low) as the user will rate as bad (i.e., numerically high). However, this assumption may not be realistic, because there may typically be many bad geobodies but very few good geobodies. Thus, using a logarithmic model 70 for the link function, as depicted in FIG. 5, may be more realistic. Again, the x-axis 62 is the combined rank of each geobody, $-w^T s$, and the y-axis 64 is the user rating for each geobody, $g_j$. The logarithmic model 70 assumes that many geobodies receive bad user ratings while only a few geobodies receive good user ratings. Because the user rating is an ordinal measurement, another alternative is a using multinomial logistic model 80, as depicted in FIG. 6, which allows more flexibility. Again, the x-axis 62 is the combined rank of each geobody, $-w^T s$, and the y-axis 64 is the user rating for each geobody, $g_j$. The probability that a geobody's user rating is larger than k is modeled by a logistic function:

$$P(\tilde{g}_j > k | s_j) = \text{logistic}(-w^T s_j + c_k) \quad (2)$$

and is depicted in the probability model 90 in FIG. 7. The x-axis 92 is the combined rank of each geobody, $-w^T s$, and the y-axis 94 is the probability $P(\tilde{g}_j > k | s_j)$. The logarithmic model 70 makes stronger assumptions than the logistic model 80. Specifically, while it may take fewer data points to create the logarithmic model 70, the logarithmic model 70 may be too rigid to sufficiently fit the relationship between the combined rank and the user rating of the geobodies. On the other hand, the logistic model 80 provides more flexibility, while more model parameters are estimated. The logistic model 80 becomes more prone to over-fitting and requires more data for accurate estimation of the model parameters.

Once the desired model is applied, the active ranking system 6 may present the user with the highest-ranking geobody, unrated in the combined ranked list 20 of geobodies. In some embodiments, the geobody presented to the user may be selected based on other criteria. For example, the geobody presented to the user may be a randomly selected unrated geobody. The user may rate 44 the geobody by providing a rating on a scale of 1 to 6 (where 1 is best and 6 is worst). In some embodiments, the rating scale may be within any range of numbers, such as 0 to 10 or 1 to 100. Alternatively, the user may provide a positive, negative, or neutral rating.

After obtaining the user rating, the active ranking system 6 may refine 46 the generalized linear model 40 describing the relationship between the combined score and the user rating for the geobodies based on the user rating 44. Specifically, the generalized linear model is updated with the geobody's user rating, $g_j$. The generalized linear model may be adjusted to fit the geobody's user rating, $g_j$, by minimizing objective functions of the weight w. The objective functions may take different forms. In some embodiments, the sum of squared residuals is minimized (i.e., the least squares method or the $l_2$ norm), wherein a residual is the difference between the user rating and a fitted value provided by the generalized linear model. The data-fitting term for the objective function is thus:

$$L_j(w) = \|g_j - f(w^T s_j)\|_2^2. \quad (3)$$

However, the least squares method may not be robust to outliers. When the relationship between the combined rank and the user rating of the geobody is likely to include outliers, a more robust method may be desired. In some embodiments, the sum of absolute errors may be minimized (i.e., least absolute deviations method or the $l_1$ norm), wherein the absolute errors are the absolute values of the differences between the user rating and the fitted value provided by the generalized linear model. The data-fitting term for the objective function is thus:

$$L_j(w) = \|g_j - f(w^T s_j)\|_1. \quad (4)$$

If the logistic model is employed as the generalized linear model, then the fitting may be achieved by maximum likelihood estimation. The negative log-likelihood method may be used to minimize objective functions of weighting parameters w:

$$L_j(w) = -\log P(g_j | s_j; w, c_k). \quad (5)$$

In addition to the data-fitting term, regularization terms are also incorporated in the objective function to prevent unreasonable solutions. The non-negativity of w may be enforced by assuming that the plurality of graphical models 14 should have no negative contributions and removing the graphical models with negative weights. Furthermore, a constraint on the proximity $\Phi(w, w_0)$ between the updated weights w and the initial weights $w_0$ may be imposed to ensure that the graphical model weights stay close to the initialization result when there are not sufficient samples for updating w reliably. The overall objective function to minimize for fitting the generalized linear model is thus given by:

$$L(w, \theta) = \Sigma_j L_j(w) + \lambda \Phi(w, w_0), \text{ s.t., } w \geq 0, \quad (6)$$

where $\theta$ is the set of auxiliary independent variables.

Different optimization schemes may be employed to minimize the objective function based on its formulation. For example, if the least squares method is used, then the objective may be optimized using quadratic programming. If the least absolute deviations method is used, then the least absolute deviations may be rewritten as a linear function of the independent variables and additional artificial variables may be introduced for this reformulation. Additional inequality constraints may also be introduced. Then the rewritten objective function may be optimized using linear programing. If the logistic model is employed, an iteratively reweighted least squares technique may be employed to estimate the weights. By updating the weights w in the manner described above, the generalized linear model may be refined 46, and ultimately, the user-supervised ranked list 9 of geobodies may be updated 48.

The active ranking system 6 may repeat the steps 42, 44, 46, 48 until the termination criterion is met. Criteria for terminating the active ranking system 6 may include that the user is satisfied with the combined ranked list 20 of geobodies and/or that all geobodies in the combined ranked list 20 of geobodies have been rated 44.

As an example of their effectiveness, a 3D seismic volume which contains one true carbonate mound is used to test the systems and methods disclosed herein. Four groups of graphical models 14 are configured based on different combinations of geophysical attributes and relationships between these attributes. After applying the graphical models 14, a set of 117 geobodies are extracted from the 3D seismic volume. An expert evaluated the 40 best geobodies and rated them on a scale of 1 to 5 (1: very promising; 2: promising; 3: borderline; 4: not promising; 5: very not promising). The remaining geobodies are rated as 6. These expert ratings formed the ground truth rank list for validation of the test.

Two hundred iterations of active ranking system 6 are simulated. In each iteration, one graphical model is randomly sampled from each graphical model group to obtain a four-graphical model subset. The ranks generated for each geobody by each of the four graphical models 14 in the four-graphical model subset are combined into the combined ranked list 20 of geobodies through a correlation-based method. The user ratings 44 for each geobody are then simulated by providing the correct rating of a geobody based on the ground truth rank list 80% of the time. During the other 20% of the time, the simulated user's rating was 1 rating off the ground truth. This process of active ranking 24 terminated when a pre-specified set of best geobodies (e.g., the top three geobodies on the ground truth rank list) had been presented to the simulated user. Two models were tested for active ranking 24: the logarithmic model in conjunction with the least absolute deviations or the $l_1$ norm method, and the logistic model.

Figure 8:
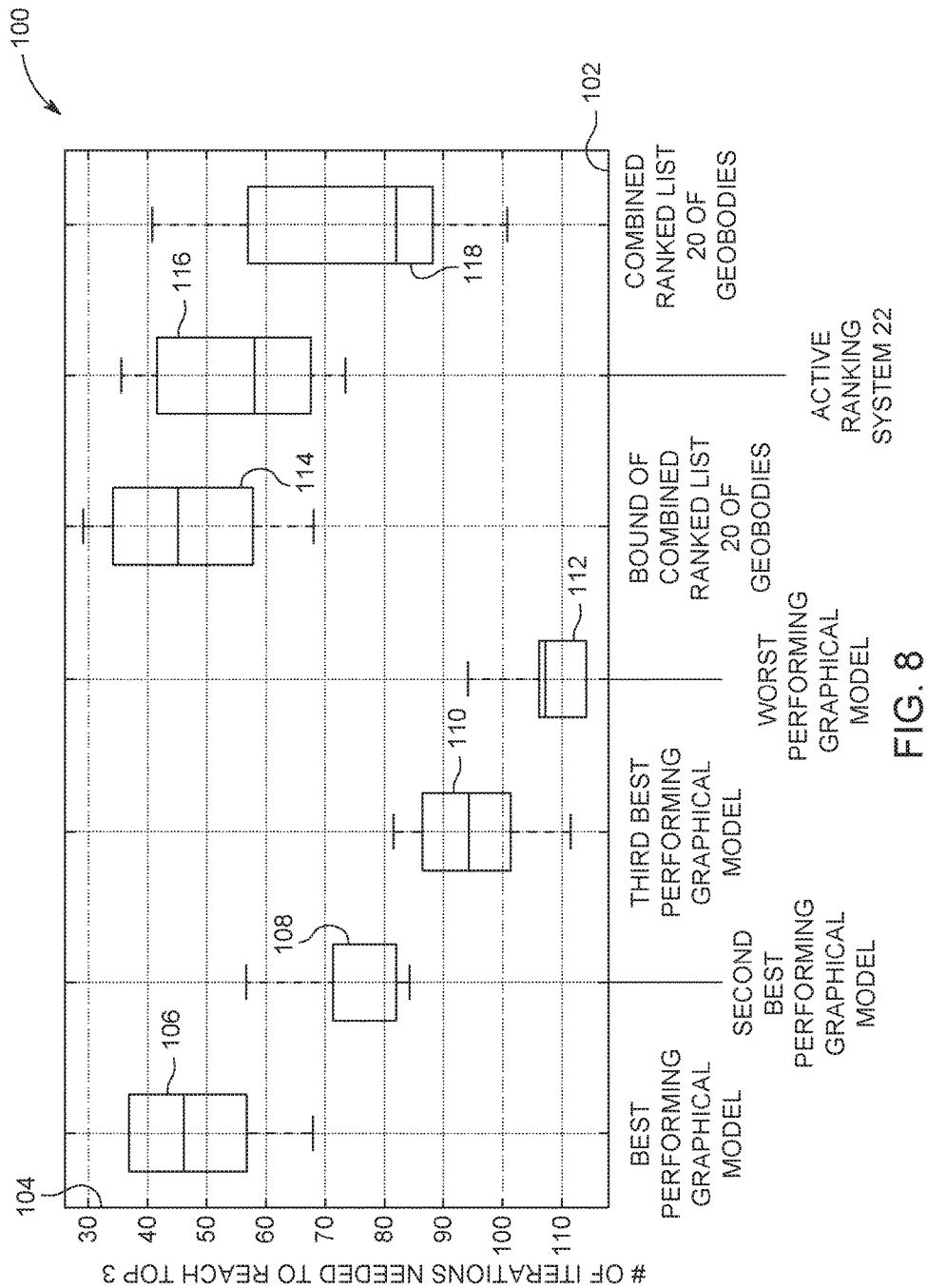
FIG. 8 is a graph that illustrates a performance of an active ranking system when a logarithmic model is applied, in accordance with aspects of the present disclosure.

FIG. 8 illustrates a graph 100 of the number of user ratings $N_u$ before the simulated user reaches the top three geobodies in the active ranking system 6 when the logarithmic model is applied. The x-axis 102 of graph 100 indexes the various combinations of graphical models used. The y-axis 104 of graph 100 represents the number of user ratings $N_u$ before the simulated user reaches the top three geobodies. The boxplots present the ranges of $N_u$ achieved by single graphical models and combined ranking in the 200-iteration test. The four boxplots to the left 106, 108, 110, 112 correspond to the best, second best, third best, and the worst of the four single graphical models 14. The three boxplots to the right 114, 116, 118 correspond to the theoretical bound of a performance of the unsupervised combined ranked list 20 of geobodies, the user-supervised ranked list 9 of geobodies, and the unsupervised combined ranked 20 of geobodies. Comparing a performance 116 of the user-supervised ranked list 9 of geobodies to a performance 118 of the unsupervised combined ranked 20 of geobodies, the improvement achieved by actively learning from the user may be observed.

Compared to the single-graphical model results 106, 108, 110, 112, the active ranking result 116 outperforms each result except for the best-performing graphical model 106. Thus, the active ranking system 6 increases the efficiency of exploiting the plurality of graphical models 14 to identify geobodies in seismic data interpretation.

Figure 9:
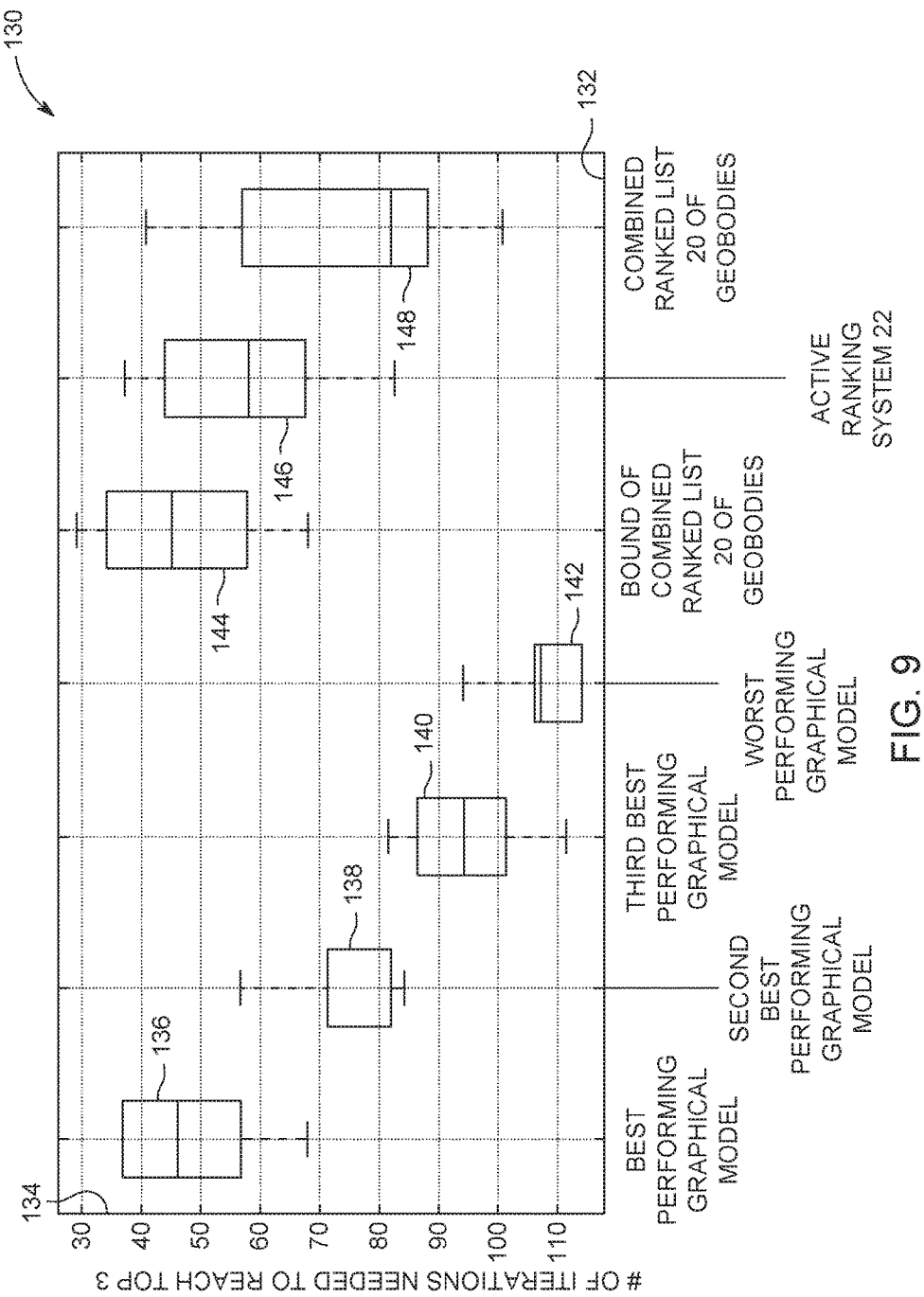
FIG. 9 is a graph that illustrates a performance of an active ranking system when a logistic model is applied, in accordance with aspects of the present disclosure.

FIG. 9 illustrates a graph 130 of the number of user ratings $N_u$ before the simulated user reaches the top three geobodies in the active ranking system 6 when the logistic model is applied. The x-axis 132 of graph 130 indexes the various combinations of graphical models used. The y-axis 134 of graph 130 represents the number of user ratings $N_u$ before the simulated user reaches the top three geobodies. The boxplots present the ranges of $N_u$ achieved by single graphical models and combined ranking in the 200-iteration test. The four boxplots to the left 136, 138, 140, 142 correspond to the best, second best, third best, and the worst of the four single graphical models 14. The three boxplots to the right 144, 146, 148 correspond to the theoretical bound of a performance of the unsupervised combined ranked list 20 of geobodies, the user-supervised ranked list 9 of geobodies, and the unsupervised combined ranked 20 of geobodies. Comparing a performance 146 of the user-supervised ranked list 9 of geobodies to a performance 148 of the unsupervised combined ranked 20 of geobodies, the improvement achieved by actively learning from the user may be observed. Compared to the single-graphical model results 136, 138, 140, 142, the active ranking result 136 outperforms each result except for the best-performing graphical model 136. Again, the active ranking system 6 increases the efficiency of exploiting the plurality of graphical models 14 to identify geobodies in seismic data interpretation.

Figure 10:
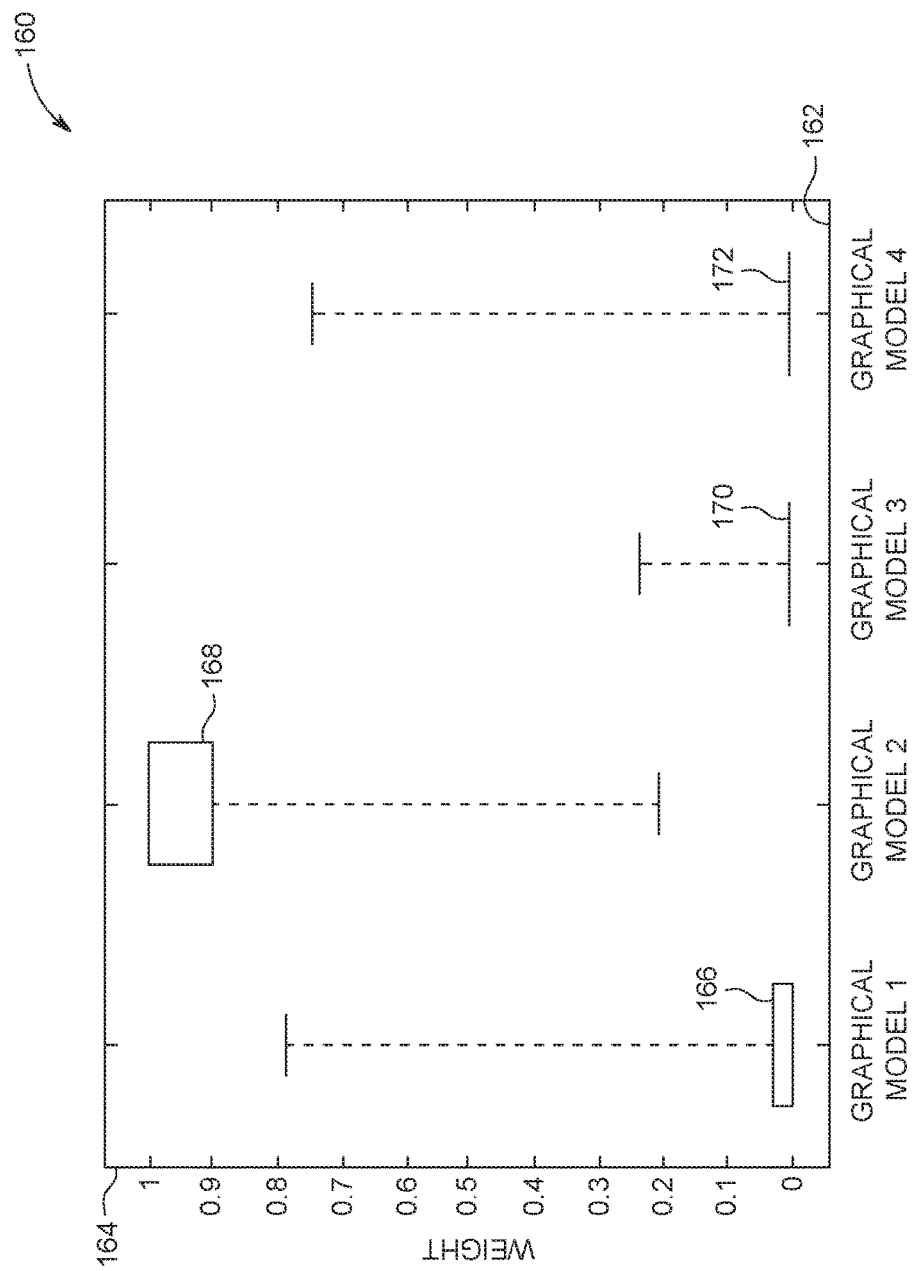
FIG. 10 is a graph that illustrates terminal graphical model weights achieved by a logarithmic model as applied to an active ranking system in accordance with aspects of the present disclosure.

FIG. 10 illustrates a graph 160 of the terminal graphical model weights achieved by the logarithmic model when the active ranking system 6 reaches the top three geobodies. The x-axis 162 of the graph 160 indexes the four graphical models 14 in the 200-iteration test. The y-axis 164 of the graph 160 represents the terminal graphical model weight. The boxplots present the range of terminal graphical model weights of the four graphical models 14 in the 200-iteration test. The terminal graphical model weight quantifies the effectiveness of the graphical model 14. As depicted in the graph 160, the second graphical model 168 is the most effective of the four graphical models 14 because it has the highest weight. The active ranking system 6 may present the terminal weights to the user so that the user can compare different graphical models 14 and select more effective graphical models 14 for future use.

Figure 11:
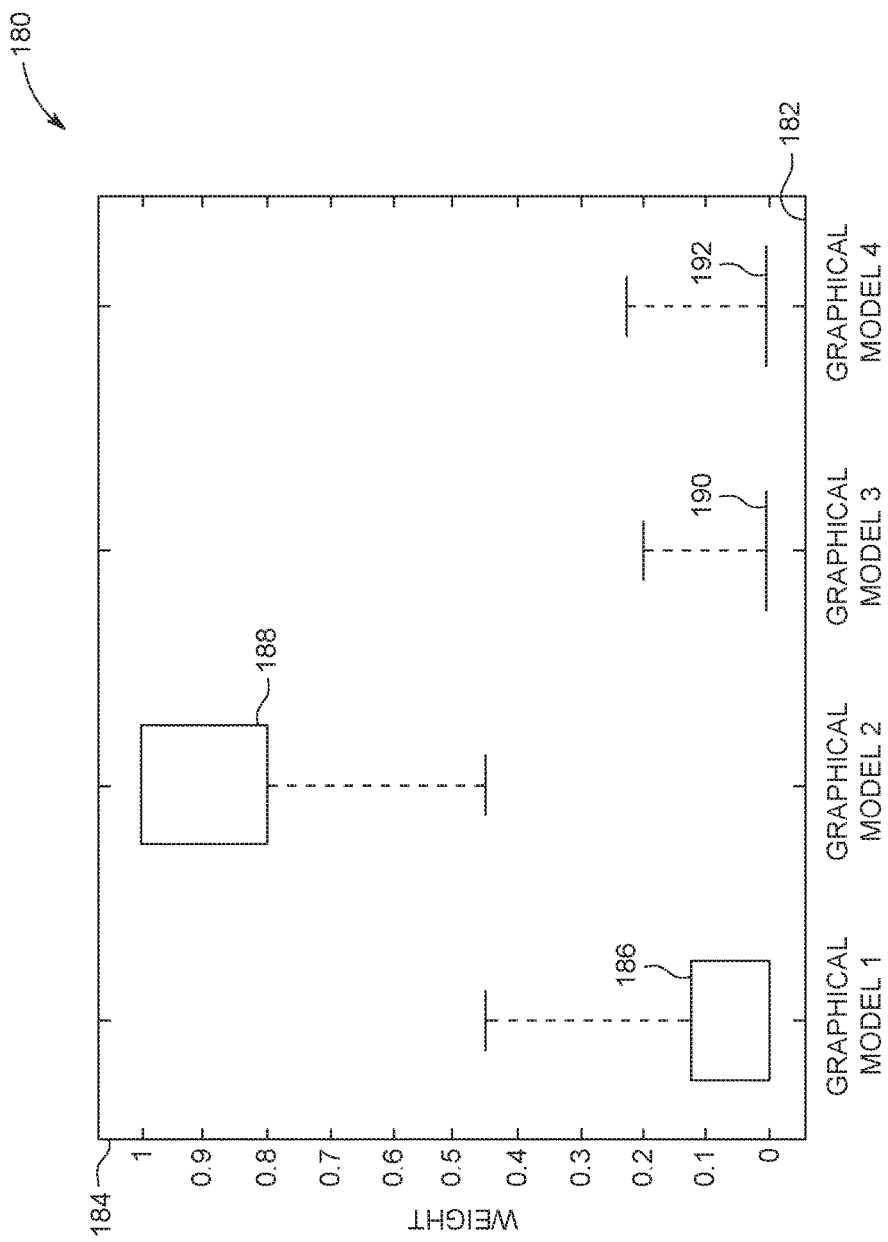
FIG. 11 is a graph that illustrates terminal graphical model weights achieved by a logistic model as applied to an active ranking system in accordance with aspects of the present disclosure.

FIG. 11 illustrates a graph 180 of the terminal model weights achieved by the logistic model when the active ranking system 6 reaches the top three geobodies. The x-axis 182 of the graph 180 indexes the four graphical models 14 in the 200-iteration test. The y-axis 184 of the graph 180 represents the terminal graphical model weight. The boxplots present the range of terminal graphical model weights of the four graphical models 14 in the 200-iteration test. The terminal graphical model weight quantifies the effectiveness of the graphical model 14. As depicted in the graph 180, the second graphical model 188 is the most effective of the four graphical models 14 because it has the highest weight. The active ranking system 6 may present the terminal weights to the user so that the user can compare different graphical models 14 and select more effective graphical models 14 for future use.

Figure 12:
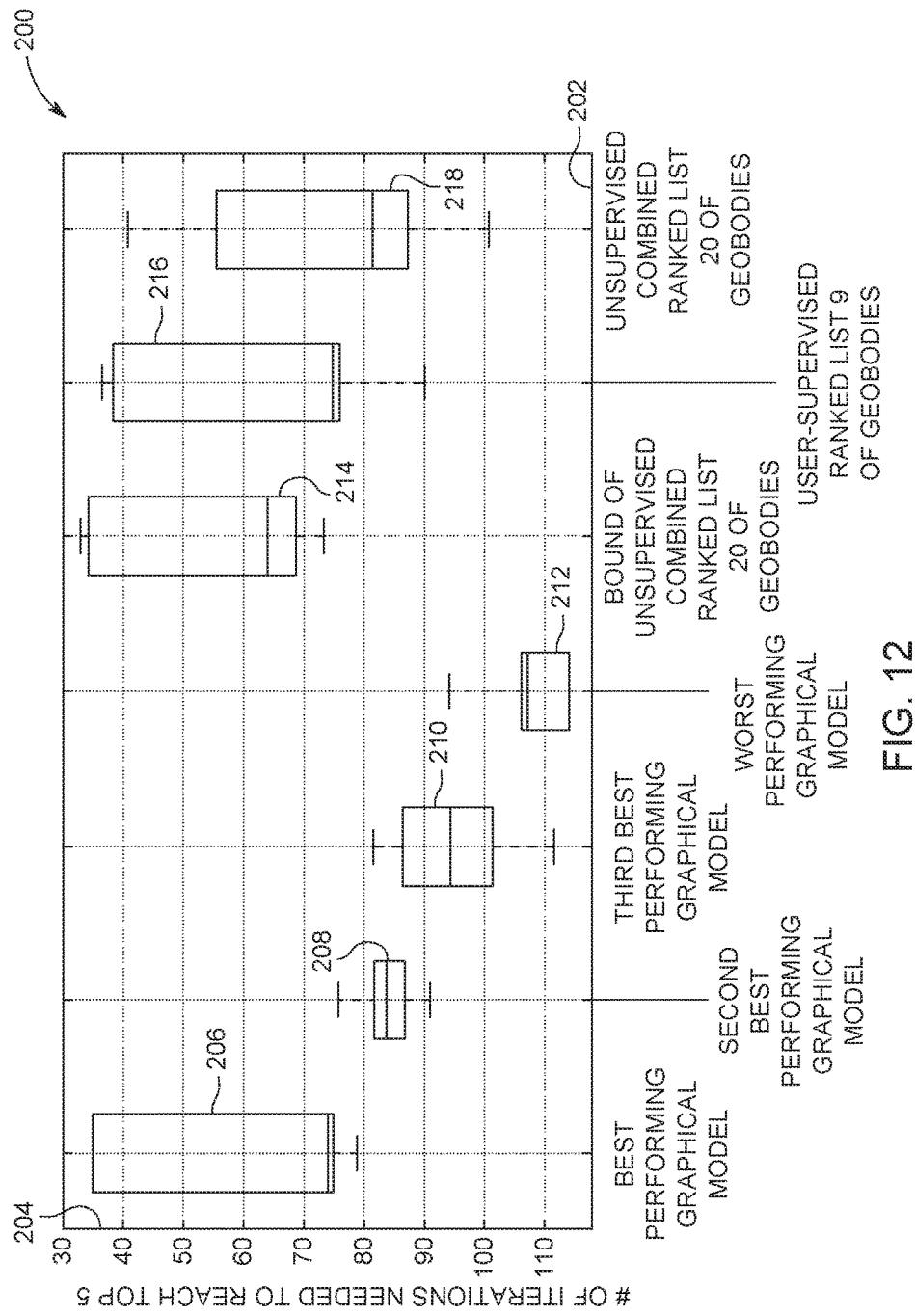
FIG. 12 is a graph that illustrates a performance of an active ranking system when a logarithmic model is applied, in accordance with aspects of the present disclosure.

FIG. 12 illustrates a graph 200 of the number of user ratings $N_u$ before the simulated user reaches the top five geobodies in the active ranking system 6 when the logarithmic model is applied. The x-axis 202 of graph 200 indexes the various combinations of graphical models used. The y-axis 204 of graph 200 represents the number of user ratings $N_u$ before the simulated user reaches the top five geobodies. The boxplots present the ranges of $N_u$ achieved by single graphical models and combined ranking in the 200-iteration test. The four boxplots to the left 206, 208, 210, 212 correspond to the best, second best, third best, and the worst of the four single graphical models 14. The three boxplots to the right 214, 216, 218 correspond to the theoretical bound of a performance of the unsupervised combined ranked list 20 of geobodies, the user-supervised ranked list 9 of geobodies, and the unsupervised combined ranked 20 of geobodies. Comparing a performance 216 of the user-supervised ranked list 9 of geobodies to a performance 218 of the unsupervised combined ranked 20 of geobodies, the improvement achieved by actively learning from the user may be observed. Compared to the single-graphical model results 206, 208, 210, 212, the active ranking result 216 outperforms each result except for the best-performing graphical model 206. Thus, the active ranking system 6 increases the efficiency of exploiting the plurality of graphical models 14 to identify geobodies in seismic data interpretation.

Figure 13:
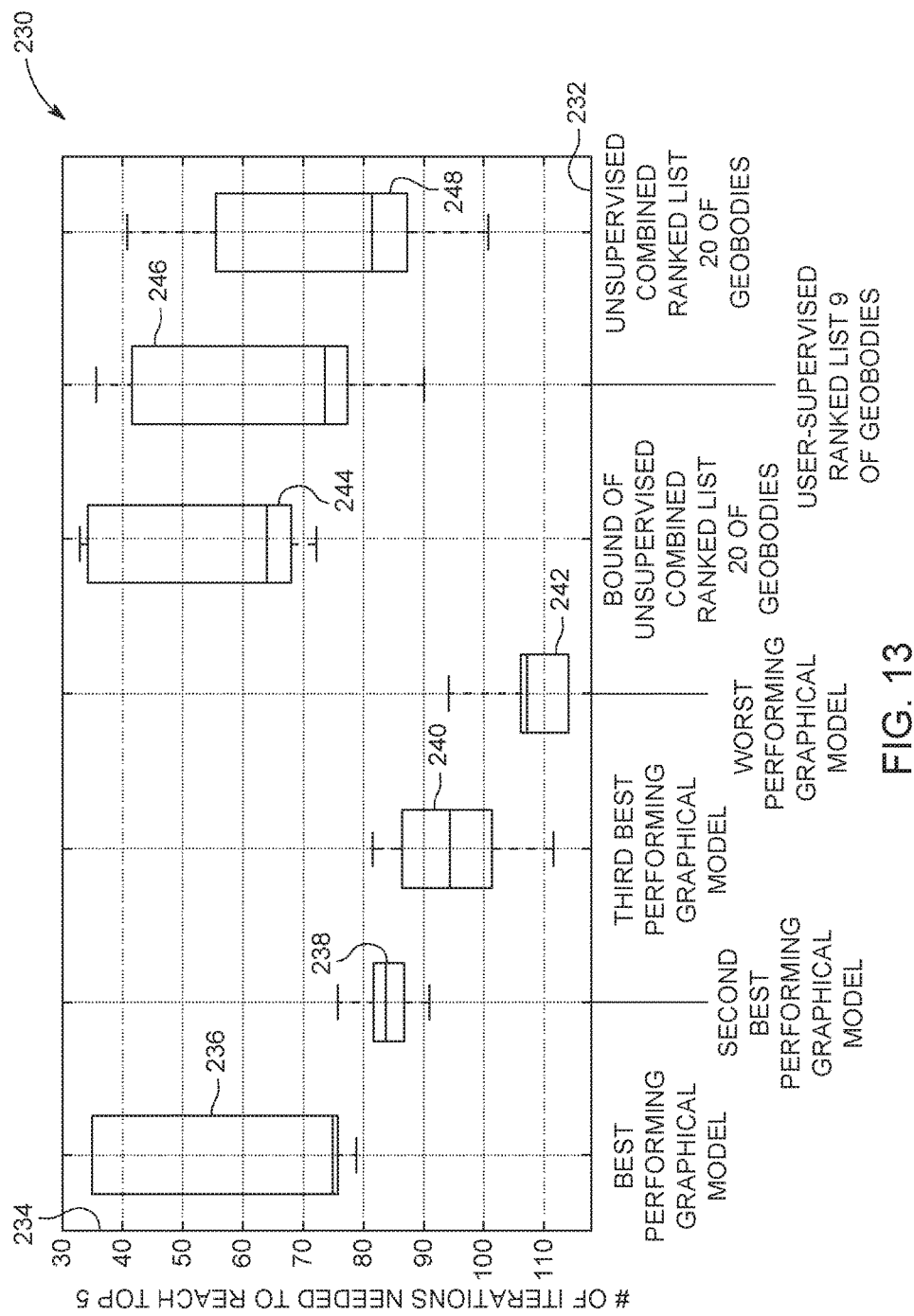
FIG. 13 is a graph that illustrates a performance of an active ranking system when a logistic model is applied, in accordance with aspects of the present disclosure.

FIG. 13 illustrates a graph 230 of the number of user ratings $N_u$ before the simulated user reaches the top five geobodies in the active ranking system 6 when the logistic model is applied. The x-axis 232 of graph 230 indexes the various combinations of graphical models used. The y-axis 234 of graph 230 represents the number of user ratings $N_u$ before the simulated user reaches the top five geobodies. The boxplots present the ranges of $N_u$ achieved by single graphical models and combined ranking in the 200-iteration test. The four boxplots to the left 236, 238, 240, 242 correspond to the best, second best, third best, and the worst of the four single graphical models 14. The three boxplots to the right 244, 246, 248 correspond to the theoretical bound of a performance of the unsupervised combined ranked list 20 of geobodies, the user-supervised ranked list 9 of geobodies, and the unsupervised combined ranked 20 of geobodies. Comparing a performance 246 of the user-supervised ranked list 9 of geobodies to a performance 248 of the unsupervised combined ranked 20 of geobodies, the improvement achieved by actively learning from the user may be observed. Compared to the single-graphical model results 236, 238, 240, 242, the active ranking result 236 outperforms each result except for the best-performing graphical model 236. Again, the active ranking system 6 increases the efficiency of exploiting the plurality of graphical models 14 to identify geobodies in seismic data interpretation.

Figure 14:
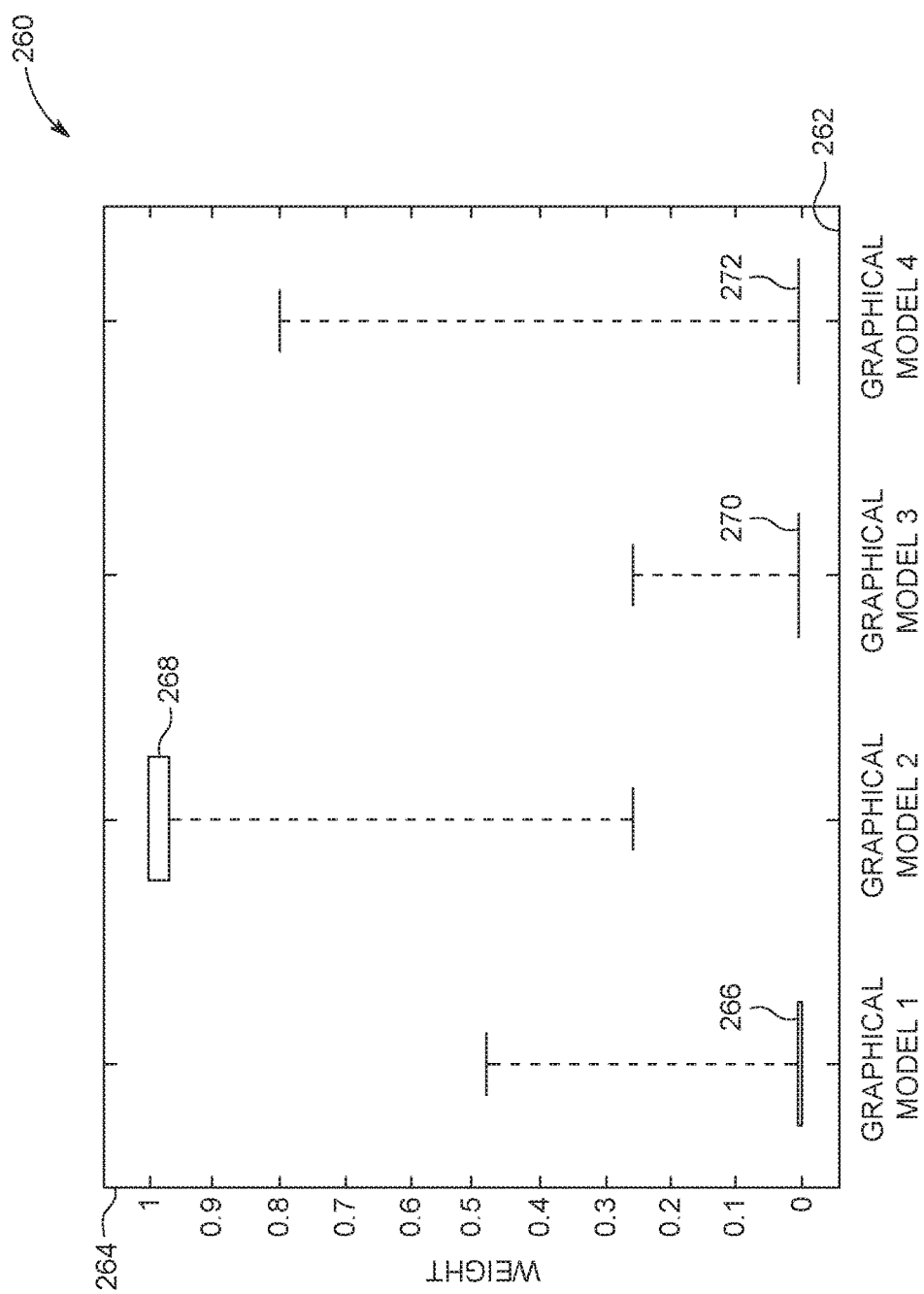
FIG. 14 is a graph that illustrates terminal graphical model weights achieved by a logarithmic model as applied to an active ranking system in accordance with aspects of the present disclosure.

FIG. 14 illustrates a graph 260 of the terminal graphical model weights achieved by the logarithmic model when the active ranking system 6 reaches the top five geobodies. The x-axis 262 of the graph 260 indexes the four graphical models 14 in the 200-iteration test. The y-axis 264 of the graph 260 represents the terminal graphical model weight. The boxplots present the range of terminal graphical model weights of the four graphical models 14 in the 200-iteration test. The terminal graphical model weight quantifies the effectiveness of the graphical model 14. As depicted in the graph 260, the second graphical model 268 is the most effective of the four graphical models 14 because it has the highest weight. The active ranking system 6 may present the terminal weights to the user so that the user can compare different graphical models 14 and select more effective graphical models 14 for future use.

Figure 15:
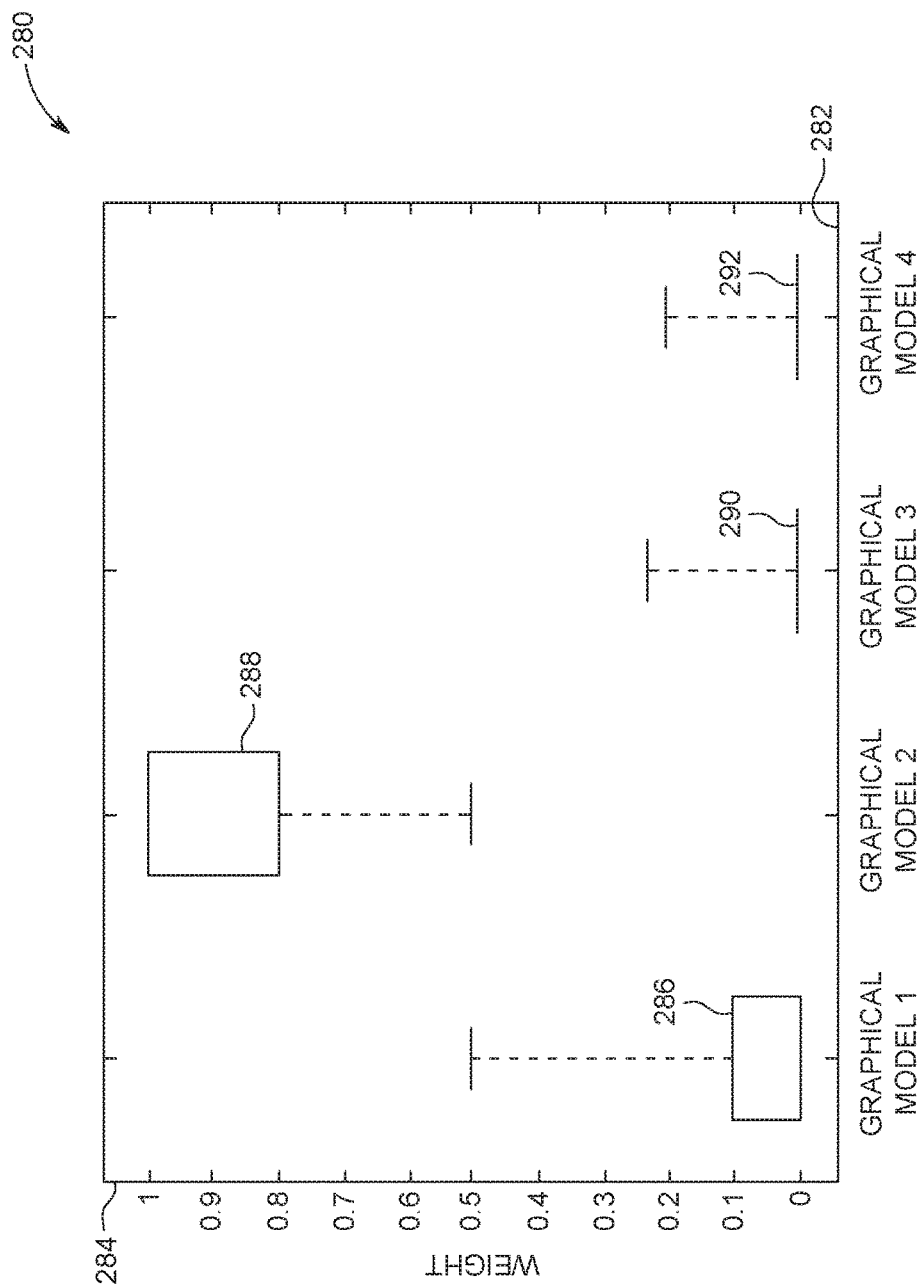
FIG. 15 is a graph that illustrates terminal graphical model weights achieved by a logistic model as applied to an active ranking system in accordance with aspects of the present disclosure.

FIG. 15 illustrates a graph 280 of the terminal model weights achieved by the logistic model when the active ranking system 6 reaches the top five geobodies. The x-axis 282 of the graph 280 indexes the four graphical models 14 in the 200-iteration test. The y-axis 284 of the graph 280 represents the terminal graphical model weight. The boxplots present the range of terminal graphical model weights of the four graphical models 14 in the 200-iteration test. The terminal graphical model weight quantifies the effectiveness of the graphical model 14. As depicted in the graph 280, the second graphical model 288 is the most effective of the four graphical models 14 because it has the highest weight. The active ranking system 6 may present the terminal weights to the user so that the user can compare different graphical models 14 and select more effective graphical models 14 for future use.

The results observed when the active ranking system 6 reaches the top five geobodies (FIGS. 11-14) confirmed the behavior of the active ranking system 6 when it reached the top three geobodies (FIGS. 7-10). Additionally, the logarithmic model and the logistic model provided similar results. Thus, both the logarithmic model and the logistic model are effective for use by the disclosed active ranking system 6. Since the logistic model may be more flexible, it would be expected that the logistic model may have broader applications than the logarithmic model.

Figure 16:
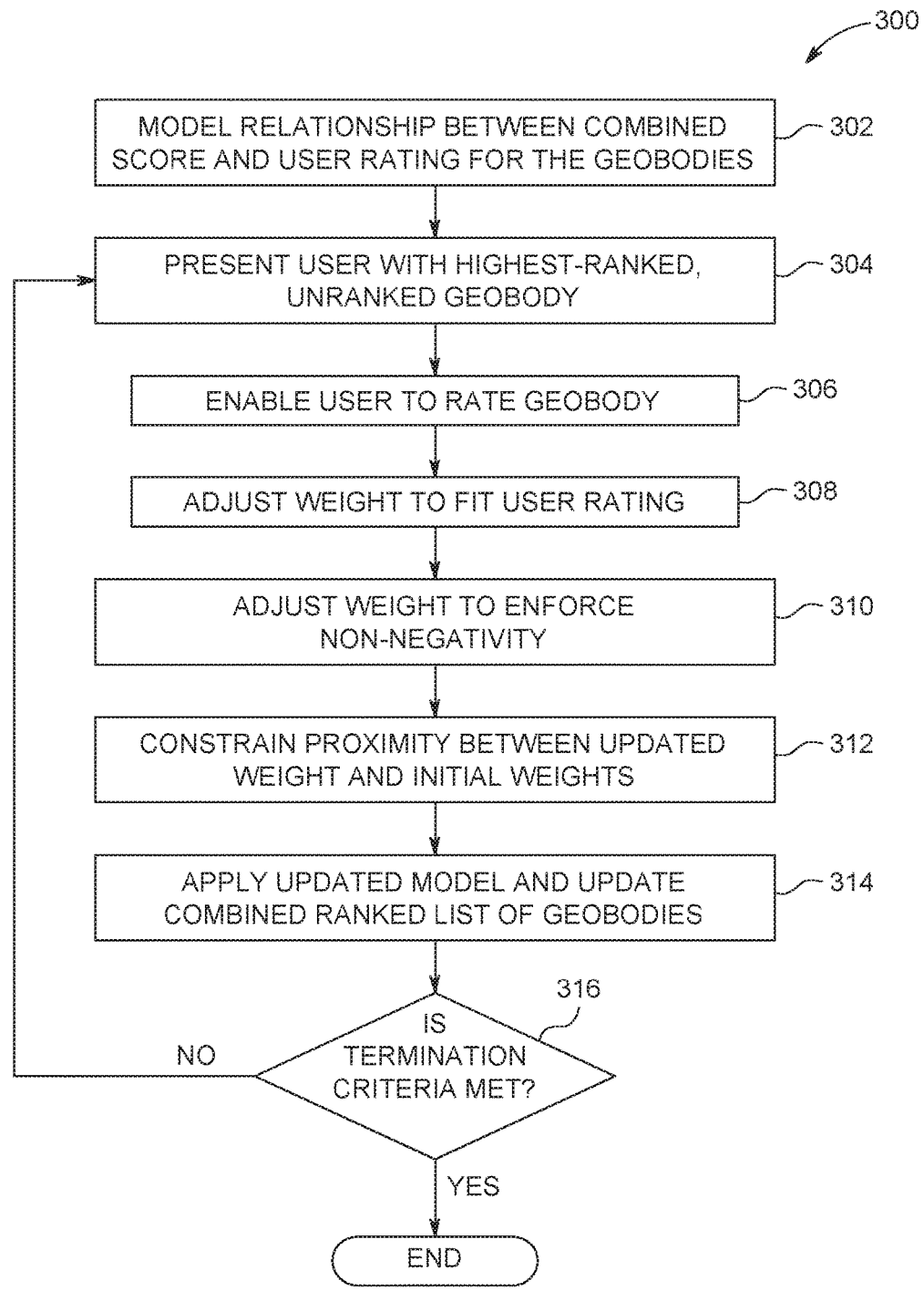
FIG. 16 is a flow chart illustrating an embodiment of a method for active ranking in accordance with aspects of the present disclosure.

FIG. 16 is a flow chart illustrating an embodiment of a method for active ranking 300. First, the relationship between the combined score and the user rating for the geobodies is modeled (block 302). Specifically, the generalized linear model may be used to model the relationship between the geobodies' scores, $s_{i,j}$, and optimal user ratings, $\tilde{g}_j$. The generalized linear model may be employed which assumes:

$$E(\tilde{g}_j) = f(w^T s_j) \tag{7}$$

where $f(w^T s_j)$ is a function linking the linearly weighted combined score, $w^T s$, of geobody j with the expected optimal user rating $E(\tilde{g}_j)$ of geobody j. The link function may be in the form of the linear model 60, the logarithmic model 70, or the multinomial logistic model 80. The weights w may be initialized with the unsupervised combined ranked list 20 of geobodies. Next, the user may be presented (block 304) with the highest-ranked, unrated geobody from the combined ranked list 20 of geobodies. In some embodiments, the geobody presented to the user may be selected based on other criteria. For example, the geobody presented to the user may be a randomly selected unrated geobody. The user may rate (block 306) the geobody using the scale of 1 to 6 (where 1 is best and 6 is worst). In some embodiments, the rating scale may be within any range of numbers, such as 0 to 10 or 1 to 100. Alternatively, the user may provide a positive, negative, or neutral rating.

Once the geobody is rated, the weight w of the linearly weighted combined score, $w^T s$, may be adjusted (block 308) to fit the link function of the generalized linear model to the user rating, $g_j$. Specifically, the objective functions of the weight w may be minimized. In some embodiments, the objective function takes the form of the least squares method or the $l_2$ norm (i.e., where the sum of squared residuals is minimized and the residual is the difference between the user rating and the fitted value provided by the generalized linear model). The data-fitting term for the least squares objective function is thus:

$$L_j(w) = \|g_j - f(w^T s_j)\|_2^2. \tag{8}$$

However, because, the least squares method is not robust to outliers, some embodiments may use the more robust method of the least absolute deviations method or the $l_1$ norm (i.e., where the sum of absolute errors may be minimized and the absolute errors are the absolute values of the differences between the user rating and the fitted value provided by the generalized linear model). The data-fitting term for the least absolute deviations objective function is thus:

$$L_j(w) = \|g_j - f(w^T s_j)\|_1. \tag{9}$$

If the logistic model is employed as the generalized linear model, then the fitting may be achieved by maximum likelihood estimation. The negative log-likelihood method may be used to minimize objective functions of the weighting parameters w:

$$L_j(w) = -\log P(g_j | s_j; w, c_k). \tag{10}$$

Additionally, in some embodiments, the weight w may be adjusted to enforce non-negativity by assuming that the plurality of graphical models 14 should have no negative contributions and removing the graphical models with negative weights. Furthermore, in some embodiments, the weight w may be adjusted to constrain the proximity $\Phi(w, w_0)$ between the updated weights w and the initial weights $w_0$ to ensure that the graphical model weights stay close to the initialization result when there are not sufficient samples for updating w reliably. The overall objective function to minimize for fitting the generalized linear model is thus given by $$L(w, \theta) = \Sigma_j L_j(w) + \lambda \Phi(w, w_0), \quad s.t., \quad w \geq 0, \qquad (11)$$

where $\theta$ is the set of auxiliary independent variables.

Different optimization schemes may be employed to minimize the objective function based on its formulation. For example, if the least squares method is used, then the objective function may be optimized using quadratic programming. If the least absolute deviations method is used, then the least absolute deviations may be rewritten as a linear function of the independent variables and additional artificial variables may be introduced for this reformulation. Additional inequality constraints may also be introduced. Then the rewritten objective function is optimized using linear programing. If the logistic model is employed, an iteratively reweighted least squares technique may be employed to estimate the weights.

Once the weights w are updated, the updated generalized linear model may be applied and the combined ranked list 20 of geobodies updated (block 314). The active ranking method 300 then checks to see if the termination criteria have been met (block 316). If so, then the active ranking method 300 is complete and ends. If the termination criteria have not been met, the active ranking method 300 repeats blocks 304-314. Criteria for terminating the active ranking method 300 may include that the user is satisfied with the combined ranked list 20 of geobodies and/or that all geobodies in the combined ranked list 20 of geobodies have been rated by the user.

Technical effects of the invention include systems and methods for active ranking that interacts with the user and actively learns from user feedback to iteratively refine a ranking of geobodies in seismic data interpretation. The present active ranking system may be based on any seismic data interpretation input. In some embodiments, the inputs may be a plurality of graphical model scores for each geobody generated by a plurality of graphical models. A combined score for each geobody may be derived from the plurality of graphical model scores using generalized linear models. Geobodies may be ranked by their combined scores in a combined ranked list of geobodies. The generalized linear models are dynamically updated by incorporating user ratings of the geobodies. The combined ranked list of geobodies is updated accordingly when the generalized linear model is updated. Besides the updated combined ranked list of geobodies, the user may also have access to the terminal graphical model weights that quantify the effectiveness of corresponding graphical models. Test results showed that the disclosed systems and methods improve an efficiency of identifying geobodies in seismic data interpretation and an efficiency of evaluating the plurality of graphical models. The disclosed systems and methods reduce an amount of user evaluations needed for the user to identify the most promising geobodies. The disclosed systems and methods also significantly reduced an amount of human labor needed to evaluate prospective graphical models.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for identifying a plurality of features of interest in a seismic data set, comprising:
    generating a combined score for each of a plurality of features of interest in a seismic data set, comprising:
        generating a plurality of scores for a specific feature of interest of the plurality of features of interest, wherein each score of the plurality of scores is representative of the specific feature's agreement with a respective graphical model of a plurality of graphical models, wherein each graphical model is assigned a respective weight, wherein each of the plurality of graphical models comprises one or more attributes and one or more rules stored in a configuration file, wherein generating the plurality of scores for the specific feature of interest comprises comparing a seismic image of the specific feature of interest to the plurality of graphical models; and
        combining the plurality of scores for the specific feature of interest according to the weights assigned to the plurality of respective graphical models; ranking the plurality of features of interest based on the combined score of each feature of interest;
    updating the ranking of the plurality of features of interest based on user feedback, wherein updating the ranking based on user feedback comprises performing acts of:
        (1) presenting a user with a highly-ranking feature of interest of the plurality of features of interest that has not been rated by the user;
        (2) receiving a user rating for the presented feature of interest
        (3) updating the respective weights of the plurality of graphical models based on the user rating;
        (4) updating the combined scores for the plurality of features of interest based on the updated respective weights of the plurality of graphical models;
        (5) revising the ranking of the plurality of features of interest based on the updated combined scores for the plurality of features of interest;
        (6) repeating steps (1)-(5) until a termination criterion is met; and
        (7) outputting the revised ranking of the plurality of features of interest.

2. The method of claim 1, comprising generating a generalized linear model comprising modeling a relationship between the rank of each feature of interest and the user rating of the feature of interest.

3. The method of claim 2, wherein modeling a relationship between the rank of each feature of interest and the user rating for the presented feature of interest comprises linking a linearly weighted combined rank of the feature of interest with an expected optimal user score of the feature of interest.

4. The method of claim 1, wherein receiving a user rating for the presented feature of interest comprises receiving a numerical rating.

5. The method of claim 1, wherein updating the respective weights of the plurality of graphical models based on the user rating comprises:
minimizing a sum of squared residuals, wherein the residual is a difference between the user rating and a fitted value provided by a generalized linear model;
minimizing a sum of absolute errors, wherein the absolute errors are the absolute values of the vertical residuals between the user rating and the fitted value provided by the generalized linear model; or
maximum likelihood estimation.

6. The method of claim 1, wherein the termination criterion comprises the user indicating satisfaction with the ranking of the plurality of features of interest.

7. A system for identifying a plurality of features of interest in a seismic data set, comprising:
a processor, configured to:
generate a combined score for each of a plurality of features of interest in a seismic data set, comprising:
generating a plurality of scores for a specific feature of interest of the plurality of features of interest, wherein each score of the plurality of scores is representative of the specific feature's agreement with a respective graphical model of a plurality of graphical models, wherein each graphical model is assigned a respective weight, wherein each of the plurality of graphical models comprises one or more attributes and one or more rules stored in a configuration file, wherein generating the plurality of scores for the specific feature of interest comprises comparing a seismic image of the specific feature of interest to the plurality of graphical models; and
combining the plurality of scores for the specific feature of interest according to the weights assigned to the plurality of respective graphical models;
rank the plurality of features of interest based on the combined score of each feature of interest; and
update the ranking of the plurality of features of interest based on user feedback, wherein updating the ranking of the plurality of features of interest based on user feedback comprises executing routines for:
(1) presenting a user with a highly-ranking feature of interest of the plurality of features of interest that has not been rated by the user;
(2) receiving a user rating for the presented feature of interest;
(3) updating the respective weights of the plurality of graphical models based on the user rating;
(4) updating the combined scores for the plurality of features of interest based on the updated respective weights of the plurality of graphical models;
(5) revising the ranking of the plurality of features of interest based on the updated combined scores for the plurality of features of interest;
(6) repeating steps (1)-(5) until a termination criterion is met; and
(7) outputting the revised ranking of the plurality of features of interest.

8. The system of claim 7, wherein the processor is configured to generate a generalized linear model comprising modeling a relationship between the rank of each feature of interest and a user rating of the feature of interest and linking a linearly weighted combined rank of the feature of interest with an expected optimal user score of the feature of interest.

9. The system of claim 7, wherein the processor is configured to generate a logarithmic model comprising modeling a relationship between the rank of each feature of interest and a user rating of the feature of interest.

10. The system of claim 7, wherein the processor is configured to generate a multinomial logistic model comprising modeling a relationship between the rank of each feature of interest and a user rating of the feature of interest.

11. The system of claim 7, wherein the termination criterion comprises the user indicating satisfaction with the ranking of the plurality of features of interest.

12. The system of claim 7, wherein the termination criterion comprises each feature of interest in the plurality of features of interest having a user rating.

13. A method, comprising:
accessing a seismic data set comprising a plurality of features of interest;
defining a plurality of configuration files for a plurality of graphical models wherein each of the plurality of graphical models is defined by one or more attributes and one or more rules stored in a respective configuration file of the plurality of configuration files;
applying the plurality of graphical models to the seismic data set;
generating a combined score for each of the plurality of features of interest in the seismic data set, comprising:
generating a plurality of scores for a specific feature of interest of the plurality of features of interest, wherein each score of the plurality of scores is representative of the specific feature's agreement with a respective graphical model of the plurality of graphical models, wherein each graphical model is assigned a respective weight, wherein generating the plurality of scores for the specific feature of interest comprises comparing a seismic image of the specific feature of interest to the plurality of graphical models; and
combining the plurality of scores for the specific feature of interest according to the weights assigned to the plurality of respective graphical models;
ranking the plurality of features of interest based on the combined score of each feature of interest;
updating the ranking of the plurality of features of interest based on user feedback, wherein updating the ranking based on user feedback comprises performing the acts of:
(1) presenting a user with a highly-ranking feature of interest of the plurality of features of interest that has not been rated by the user;
(2) receiving a user rating for the presented feature of interest;
(3) updating the respective weights of the plurality of graphical models based on the user rating;
(4) updating the combined scores for the plurality of features of interest based on the updated respective weights of the plurality of graphical models;
(5) revising the ranking of the plurality of features of interest based on the updated combined scores for the plurality of features of interest;
(6) repeating steps (1)-(5) until a termination criterion is met; and
(7) outputting the revised ranking of the plurality of features of interest.

14. The method of claim 13, wherein generating a combined score for each of the plurality of features of interest in the seismic data set comprises combination based on correlation of the plurality of scores for each feature of interest.

15. The method of claim 13, wherein generating a combined score for each of the plurality of features of interest in the seismic data set comprises combination based on an average of the plurality of scores for each feature of interest.

16. The method of claim 13, wherein generating a combined score for each of the plurality of features of interest in the seismic data set comprises combination based on a maximum of the plurality of scores for each feature of interest.

* * * * *